Jan. 27, 1970   H. E. SCHALLER   3,491,818
KNIFE ASSEMBLY FOR MEAT CUTTING MACHINE
Filed April 27, 1967   2 Sheets-Sheet 1
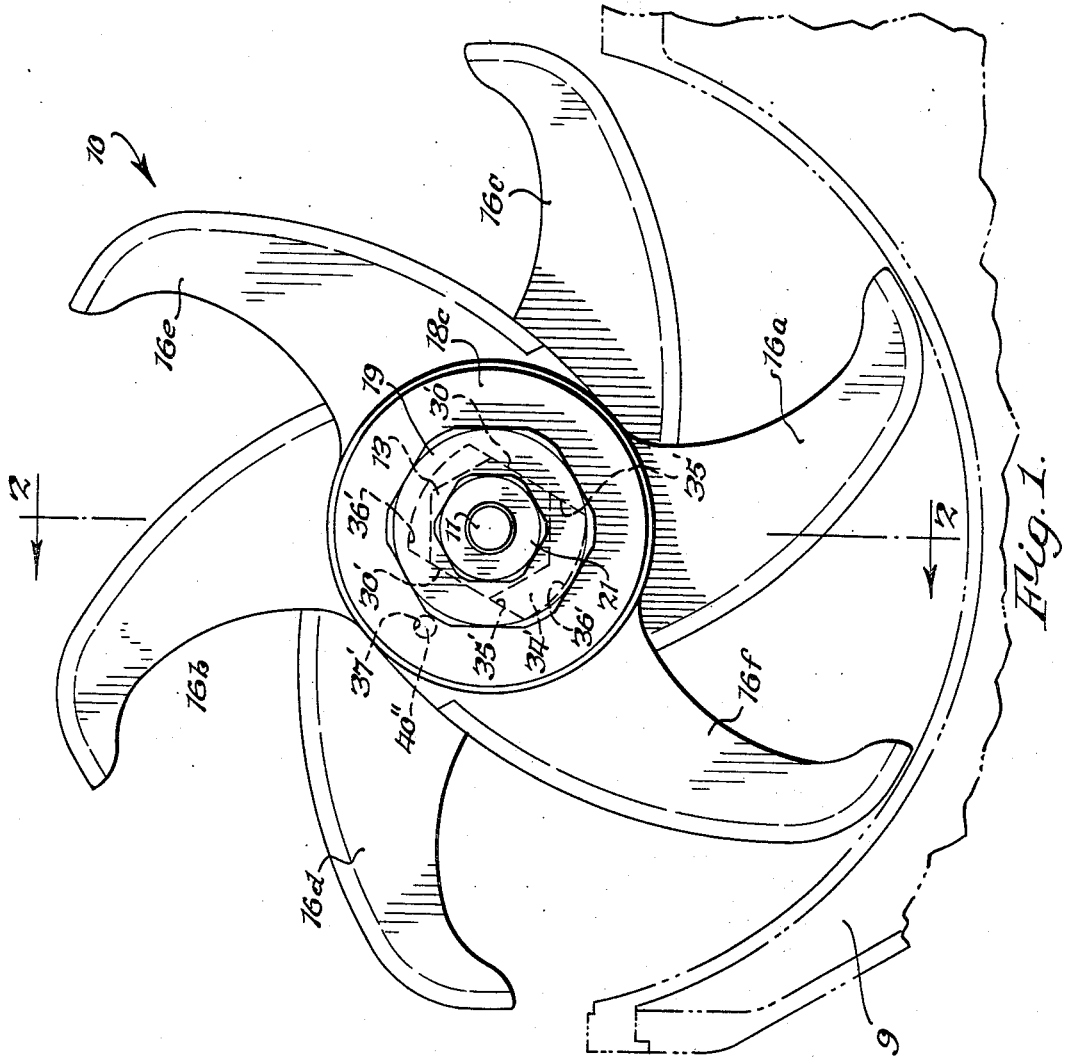
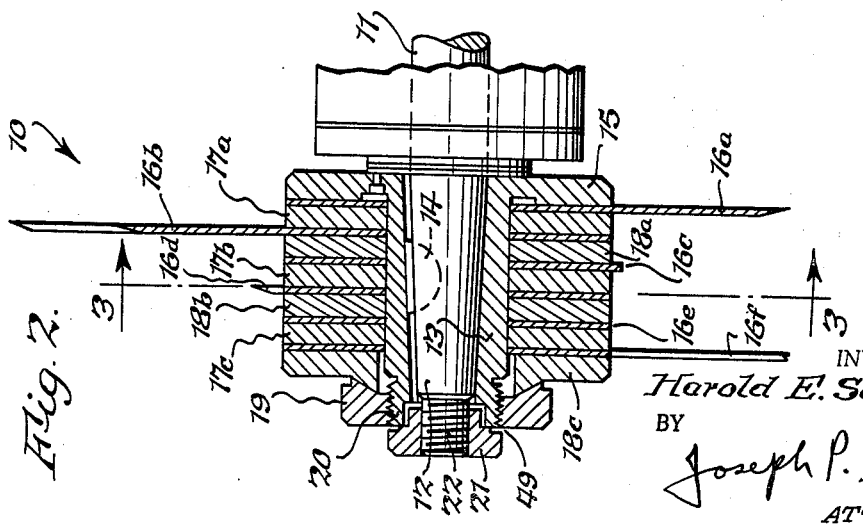
INVENTOR.
Harold E. Schaller
BY
Joseph P. Gastel
ATTORNEY.

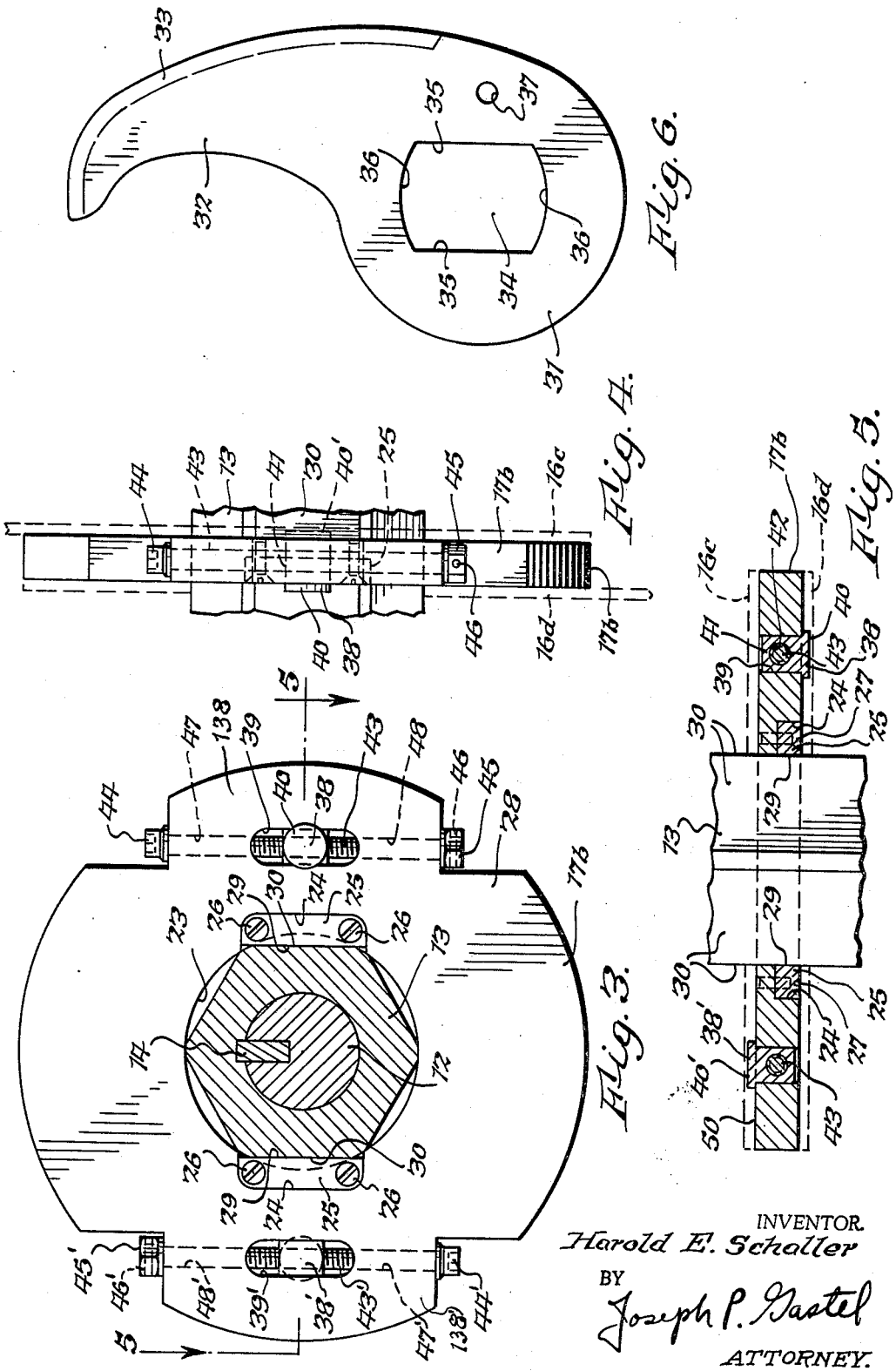

United States Patent Office 3,491,818
Patented Jan. 27, 1970

3,491,818
KNIFE ASSEMBLY FOR MEAT CUTTING MACHINE
Harold E. Schaller, East Aurora, N.Y., assignor to John E. Smith's Sons Co., Div. of Hobam, Inc., Buffalo, N.Y., a corporation of New York
Filed Apr. 27, 1967, Ser. No. 634,282
Int. Cl. B26d 1/28; A23p 1/00
U.S. Cl. 146—96                                      6 Claims

ABSTRACT OF THE DISCLOSURE

A knife assembly for a meat cutting machine including a hexagonal shaft having a plurality of knife adjusting collars axially mounted thereon with a knife mounted on the shaft on each side of each of said adjusting collars and each of said knives being sandwiched between a face of an adjusting collar and an adjacent spacer collar, each knife having a central cutout in driving engagement with opposed straight sides of the hexagonal shaft, and a micrometer adjustment on each of said adjusting collars for moving each of said knives radially of said shaft, while said central cutout maintains said driving engagement.

BACKGROUND OF THE INVENTION

The present invention relates to an improved knife assembly for a meat cutting machine of the commercial type.

Axially spaced knives have been mounted on a shaft of a meat cutting machine in the past. An example of this is shown in United States Patent No. 2,804,112. However, in an orientation such as shown in the foregoing patent, the knives were not directly connected to the shaft and therefore were in effect driven by the shaft through an intermediate connection comprising the collars between which the knives were held. This caused only a relatively small portion of the knife to be held, which could result in knife slippage with possible subsequent breakage. Furthermore, the mounting structure for the base of each knife was relatively complex in that it required intricately machined parts having a close tolerance to prevent looseness of the knives in operation. It is with an improved knife assembly for a meat cutting machine which overcomes the foregoing shortcomings that the present invention is concerned.

SUMMARY OF THE INVENTION

It is accordingly one object of the present invention to provide a knife assembly for a meat cutting machine in which each knife is firmly supported at its base by a plurality of holding arrangements which are independent of each other to positively cause each knife to remain in a fixed position under all conditions of operation, thereby eliminating knife breakage due to slipping.

It is another object of the present invention to provide an improved mounting arrangement which not only causes the knives of a meat cutting machine to be firmly mounted but which also permits them to be adjusted in an extremely simple and expedient manner.

A further object of the present invention is to provide an improved knife assembly for a meat cutting machine which is relatively simple in design and can therefore be fabricated simply and which also requires a minimum of maintenance in use. Other objects and attendant advantages of the present invention will readily be perceived hereafter.

The improved knife assembly of the present invention basically comprises a shaft, an adjusting collar mounted on the shaft, a knife having a mounting portion and a cutting portion with a cutout in the mounting portion for receiving said shaft with the cutout being of a size relative to said shaft to permit movement of the mounting portion in a direction transverse to the shaft and the cutout being of a configuration so that the knife is keyed for rotation with the shaft, micrometer adjustment means mounted on the collar, interengaging means for securing the knife to said micrometer adjustment means to effect relative movement between the knife and said shaft, a combined spacing and clamping collar mounted on said shaft on the opposite side of said knife from said adjusting collar, and means for moving the spacing collar and the adjusting collar together to clamp the knife therebetween.

In the foregoing combination there are three independent locking arrangements for maintaining the knife firmly mounted on the shaft. The first arrangement is the shape of the cutout in the knife which effectively keys the knife itself to the shaft. The second locking arrangement is the portion of the micrometer adjustment structure which also holds the knife against rotation relative to the shaft. The third locking arrangement is the frictional engagement between the knife and the collars which sandwich it therebetween. Relative to the third arrangement, it can readily be seen that since a relatively large surface area of the knife is clamped between the collars, because the central portion of the knife is mounted in surrounding relationship to the shaft, the frictional engagement clamps the knife securely relative to the shaft. The foregoing mounting of knives is repeated at axially spaced locations on the shaft by other collar combinations of an identical nature. In addition, each adjusting collar is capable of mounting a knife on each opposite face thereof, thereby simplifying the assembly. The present invention will be more fully understood when the following portions of the specification are read in conjunction with the accompanying drawings wherein:

BRIEF DESCRIPTION OF THE DRAWINGS

FIGURE 1 is an end elevational view of a plurality of knives mounted on a shaft in accordance with the principles of the present invention;

FIGURE 2 is a view partially in cross section taken substantially along line 2—2 of FIGURE 1;

FIGURE 3 is an enlarged end elevational view of an adjusting collar of the present invention;

FIGURE 4 is a side elevational view of the adjusting collar of FIGURE 3;

FIGURE 5 is a view partially in cross section taken substantially along line 5—5 of FIGURE 3; and FIGURE 6 is a side elevational view of a knife which forms a part of the improved knife assembly.

DESCRIPTION OF THE PREFERRED EMBODIMENTS

The improved knife assembly 10 is mounted relative to annular trough-like bowl 9 which rotates relative to the knife assembly in the well-known manner. Knife assembly 10 includes a transverse shaft 11 having a tapered end 12 which mounts sleeve 13 against rotation thereon by means of key 14. As can be seen from FIGURE 2 sleeve 13 has a tapered bore for complementary mating relationship with the outside of shaft end 12, and the outside of sleeve 13 is of hexagonal configuration. Sleeve 13 includes an integral annular collar 15 mounted at the end thereof.

A plurality of identical knives 16a through 16f are mounted in the indicated axially spaced relationship on sleeve 13. Also mounted on sleeve 13 are a plurality of axially spaced identical adjusting collars 17a, 17b and 17c, which are primarily used to selectively effect radial adjustment of the knives, FIGS. 3–5. Also, as can be seen from FIGURE 2, a plurality of combined spacing and clamping collars 18a, 18b and 18c are mounted in axially spaced relationship on sleeve 13. These collars cooperate with the adjusting collars to clamp the knives therebetween. The axial relationship between the various collars and knives can best be seen from FIGURE 2. It is to be noted that there are essentially three series of knives and collars shown in FIG. 2, with each series comprising an adjusting collar, a knife mounted on each opposite face of the adjusting collar, and a combined spacing and clamping collar mounted on the opposite side of each knife from the adjusting collar.

As can be seen from FIGURE 2 the entire assembly of knives 16a through 16f, adjusting collars 17a through 17c and combined spacing and clamping collars 18a through 18c are held in assembled relationship on sleeve 13 between collar 15 and nut 19, which threads onto threaded portion 20 of sleeve 13. This causes the assembly of knives and both types of collars to form an arrangement which can be mounted onto spindle 12 and removed as a unit. In this respect, it is nut 21 which threads onto threaded end portion 22 of spindle 12 to hold the foregoing assembly in mounted relationship on spindle 12.

For sake of brevity, only adjusting collar 17b (FIGS. 3–5) will be described in detail, but it will be understood that the remaining adjusting collars 17a and 17c are of identical structure. Adjusting collar 17b includes a substantially circular central cutout 23 which is of a diameter to fit over hexagonal sleeve 13, as can be seen from FIGURE 3. Opposite sides of cutout 23 include grooves 24 (FIG. 5) into which keys 25 are inserted and held in mounted position by screws 26, the faces 27 of keys 25 being flush with face 28 of adjusting collar 17b. As can be seen from FIGURE 3, each key 25 includes a straight edge 29. Edges 29 are parallel to each other and engage opposite side edges 30 of sleeve 13 to thereby effectively key collar 17b for rotation with sleeve 13, which in turn is keyed for rotation with spindle 12 by key 14. At this point it is to be noted that collar 17b is mounted on sides 30 of hexagonal sleeve 13 and each of the other collars 17c and 17a is mounted on a different pair of opposed sides of sleeve 13.

A knife is mounted on the opposite side of each adjusting collar of the 17 series. In this respect, as can be seen from FIGURE 2, knife 16d is mounted to the left of adjusting collar 17b. This knife 16d is shown in side elevation in FIG. 6 and includes a mounting portion 31 and a cutting portion 32 which is formed integrally therewith, cutting portion 32 having a cutting edge 33. A central cutout 34 is provided in mounting portion 31, with cutout 34 being larger than hexagonal sleeve 13. This is not apparent from a comparison of FIGURES 3 and 6 because FIGURE 3 was enlarged for the sake of clarity. However, assume that FIGURE 3 is half of its size and therefore the cutout 34 will fit on sleeve 13 with edges 35 of cutout 34 engaging sides 30 of sleeve 13 to provide a driving relationship between sleeve 13 and knife 31. However, the ends 36 of cutout 34 are spaced from sleeve 13 to permit knife 31 to move transversely relative to sleeve 13 during adjustment.

An arrangement is provided for adjusting the knife 16d. In this respect, an aperture 37 is provided in mounting portion 31 and this aperture receives the head 40 of pin 38 which is mounted for sliding movement in elongated slot 39, which is located in lobe 138. Head 40 extends beyond the face 28 of adjusting collar 71b but is not as thick as knife 16d. The head 40 is attached to body portion 41 having a tapped aperture 42 therein for receiving micrometer adjusting screw 43. The sides of the body portion 41 engage the sides of slot 39 to guide pin 38 for movement in the direction of the longitudinal axis of slot 39 when screw 43 is manipulated. In this respect, screw 43 includes a socket head 44 for receiving an Allen wrench. A nut 45 is pinned to the bottom of screw 43 by pin 46 so that screw 43 will rotate the collar without moving longitudinally, inasmuch as the bores 47 and 48 are of a larger size than screw 43 and are not tapped.

When it is desired to adjust the knife radially outwardly it is merely necessary to loosen nut 19 (FIG. 2) and this can be done without loosening nut 21 because of the clearance 49 therebetween. Thereafter, screw 43 is manipulated by an Allen wrench and this will cause knife 16d to move radially relative to sleeve 13 in the direction determined by the sliding engagement of sides 35 of the cutout with sides 30 of the sleeve 13. After the proper adjustment has been effected, nut 19 is tightened to firmly clamp the knife in its adjusted position. It is to be especially noted that the other knives which are not being adjusted cannot move out of their adjusted position because they are all held against movement by the continued engagement between the heads 40 of pins 38 and the apertures such as 37 in the knives.

As can be seen from FIGURES 3, 4 and 5, each adjusting collar, such as 17b is used for adjusting two knives, one placed at each opposite face of the collar. In this respect, it can readily be seen that an adjusting pin 38' corresponds to adjusting pin 38 but the head 40' thereof protrudes from the face 50 of collar 17b, which is opposite to face 28. The parts designated by the primed numerals in lobe 138' correspond to the parts having unprimed numerals in lobe 138, and a detailed description of these parts is not deemed necessary. It can thus be seen that each collar like 17b, is used for adjusting a knife on each opposite face thereof. At this point it is to be noted that each of the spacing and clamping collars 18a through 18c include a perfectly round circular central opening therein corresponding to cutout 23 of adjusting collar 17b in FIGURE 3. Therefore, the collars 18a through 18c need not be mounted on sleeve 13 in any particular orientation. They are merely slipped on in their required axial position relative to the knives and the adjusting collars.

While only the mounting of knife 16d relative to adjusting collar 17b has been described in detail, it will be appreciated that corresponding relationships exist between the remainder of the collars and knives. For example, in FIGURE 1 knife 16f is shown having aperture 37' therein which is mounted on a suitable head of a pin 40'' mounted on adjusting collar 17c. In addition, knife 16f includes a central cutout 34', corresponding to cutout 34 of knife 16d of FIGURE 6, the sides of 35' of cutout 34' engaging the sides of 30' of sleeve 13. As can be seen from FIGURE 1, the ends 36' of cutout 34' are spaced from sleeve 13 to permit knife 16f to be moved radially back and forth in response to the movement of adjusting pin 38'' which moves in the same manner as the adjusting pin described in detail above with respect to FIGURE 3.

It can readily be seen that each knife such as 16d is firmly mounted against movement relative to spindle 12 by virtue of its nonrotational engagement with sleeve 13 because of the engagement between the sides 35 of cutout 34 with the sides of sleeve 13, and because of the mounting of aperture 37 on adjusting pin 38, and further because of the clamping engagement of an extremely large area of the knife mounting portion 31 between its associated adjusting collar and combined spacing-clamping collar. The foregoing three mounting arrangements provide an extremely positive mounting which is virtually incapable of losing its adjustment and which will provde a postive drive under all conditions of operation in a simple manner without breakage due to slipping, while also permitting an extremely simple adjusting action.

While a preferred embodiment of the present invention has been disclosed, it will readily be appreciated that it is not limited thereto but may be otherwise embodied within the scope of the following claims.

I claim:

1. A knife assembly for a cutting machine, comprising a shaft, an adjusting collar, means mounting said adjusting collar for rotation with said shaft, a knife having a mounting portion and a cutting portion, a cutout in said mounting portion for receiving said shaft with said cutout being of a configuration to permit movement of said mounting portion in a direction transverse to said shaft and said cutout being of a configuration to be keyed for rotation with said shaft, micrometer adjustment means mounted on said adjusting collar, interengaging means for securing said knife to said adjustment means to effect relative movement between said knife and said shaft, a spacer collar mounted on said shaft on the opposite side of said knife from said adjusting collar, means for moving said spacer collar and adjusting collar together to clamp said knife therebetween, said adjusting collar including opposite faces and interengaging means on said first and second faces, said knife being mounted proximate one of said opposite faces, a second knife mounted proximate the other of said opposite faces, and a second spacer collar mounted on said shaft on the opposite side of said adjusting collar from said spacer collar.

2. A knife assembly for a cutting machine, comprising a shaft, an adjusting collar, means mounting said adjusting collar for rotation with said shaft, a knife having a mounting portion and a cutting portion, a cutout in said mounting portion for receiving said shaft with said cutout being of a configuration to permit movement of said mounting portion in a direction transverse to said shaft and said cutout being of a configuration to be keyed for rotation with said shaft, micrometer adjustment means mounted on said adjusting collar, interengaging means for securing said knife to said adjustment means to effect relative movement between said knife and said shaft, a spacer collar mounted on said shaft on the opposite side of said knife from said adjusting collar, means for moving said spacer collar and adjusting collar together to clamp said knife therebetween, said means for mounting said adjusting collar for rotation with said shaft comprising a member of polygonal external configuration on said shaft, and said cutout in said mounting portion including edge portions for engagement with side portions of said polygonal member to thereby effect a driving relationship therewith.

3. A knife assembly for a cutting machine, comprising a shaft, an adjusting collar, means mounting said adjusting collar for rotation with said shaft, a knife having a mounting portion and a cutting portion, a cutout in said mounting portion for receiving said shaft with said cutout being of a configuration to permit movement of said mounting portion in a direction transverse to said shaft and said cutout being of a configuration to be keyed for rotation with said shaft, micrometer adjustment means mounted on said adjusting collar, interengaging means for securing said knife to said adjustment means to effect relative movement between said knife and said shaft, a spacer collar mounted on said shaft on the opposite side of said knife from said adjusting collar, means for moving said spacer collar and adjusting collar together to clamp said knife therebetween, said interengaging means comprising pin means mounted on said adjusting collar, means for effecting a driving relationship between said adjustment means and said pin means, an aperture in said knife for receiving said pin means whereby the manipulation of said micrometer adjustment means effects a movement of said knife in a direction transverse to said shaft, a member having a polygonal external configuration on said shaft, and said cutout in said mounting portion including an edge portion for engagement with a side portion of said polygonal member to thereby effect a driving relationship therewith, said engagement between said edge portion of said cutout and said side portion of said member guiding said knife in a radial direction during the manipulation of said micrometer adjustment means.

4. A knife assembly as set forth in claim 3 including a plurality of said adjusting collars mounted in axial relationship on said shaft, a plurality of said spacer collars mounted in axial relationship on said shaft, and a plurality of said knives mounted in axial relationship on said shaft, with a spacer collar mounted on opposite sides of each adjusting collar and a knife mounted between each spacer collar and its adjacent adjusting collar.

5. An adjusting collar for adjustably mounting a knife on a shaft comprising a body portion having opposed first and second parallel faces, a non-circular cutout having opposed parallel sides located substantially centrally within said body portion for effecting a keying relationship with said shaft, micrometer adjusting means mounted on said collar including screw means lying between said opposed faces of said collar, an elongated slot in said collar having a longitudinal axis extending substantially parallel to said opposed sides, pin means mounted for movement on said screw means within said slot and extending beyond said first face of said collar for engaging a knife, second micrometer adjustment means mounted on said collar including second screw means lying between said opposed faces of said collar, a second elongated slot in said collar, and second pin means mounted for movement within said slot and extending beyond said second face of said collar for engaging a second knife.

6. An adjusting collar as set forth in claim 5 wherein said second elongated slot includes a second longitudinal axis extending substantially parallel to said opposed sides, with said elongated slot and said second elongated slot being substantially parallel to each other and lying on opposite sides of said cutout.

References Cited

UNITED STATES PATENTS

| 2,721,593 | 10/1955 | Schaller | 146—67 |
| 2,804,112 | 8/1957 | Schaller | 146—67 X |
| 2,854,045 | 9/1958 | Schmidt et al. | 146—67 X |
| 3,330,317 | 7/1967 | Schaller | 146—67 |

W. GRAYDON ABERCROMBIE, Primary Examiner

U.S. Cl. X.R.

146—67